(12) United States Patent
Hasenour et al.

(10) Patent No.: US 10,390,486 B2
(45) Date of Patent: Aug. 27, 2019

(54) POLYMER USED AS DRAPER BELT CONTACT SURFACE

(71) Applicant: Deere & Company, Moline, IL (US)

(72) Inventors: Anthony M. Hasenour, Port Byron, IL (US); Gregory S. McCunn, Orion, IL (US); Daniel S. Hoffman, Bettendorf, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 15/730,267

(22) Filed: Oct. 11, 2017

(65) Prior Publication Data
US 2019/0104684 A1 Apr. 11, 2019

(51) Int. Cl.
| A01D 61/02 | (2006.01) |
| B65G 15/42 | (2006.01) |
| A01D 57/06 | (2006.01) |
| A01D 41/14 | (2006.01) |
| A01D 34/14 | (2006.01) |

(52) U.S. Cl.
CPC .............. *A01D 61/02* (2013.01); *A01D 41/14* (2013.01); *A01D 57/06* (2013.01); *B65G 15/42* (2013.01); *A01D 34/14* (2013.01)

(58) Field of Classification Search
CPC ........ A01D 61/02; A01D 34/14; A01D 57/06; A01D 57/20; A01D 61/002; A01D 41/14; A01D 43/06; B65G 15/42
See application file for complete search history.

(56) References Cited

U.S. PATENT DOCUMENTS

| 1,862,101 A | * | 6/1932 | Pax ....................... A01D 61/002 198/523 |
| 2,347,365 A | * | 4/1944 | Paradise ................ A01D 57/20 198/699 |
| 2,685,958 A | * | 8/1954 | White, Jr. ................ E02F 7/00 198/836.1 |
| 3,344,909 A | * | 10/1967 | Hansen .............. B65G 21/2081 198/836.1 |
| 5,459,986 A | * | 10/1995 | Talbot .................. A01D 61/002 56/14.5 |
| 5,478,277 A | | 12/1995 | Kloefkorn |
| 7,640,720 B1 | * | 1/2010 | Lovett .................... A01D 57/20 56/181 |
| 7,971,418 B2 | * | 7/2011 | Conrad ................ A01D 41/148 56/162 |

(Continued)

FOREIGN PATENT DOCUMENTS

EP 2422606 A2 2/2012

OTHER PUBLICATIONS

European Patent Office Extended Search Report for Application No. 18199262.9 dated Mar. 15, 2019 (9 pages).

*Primary Examiner* — Arpad Fabian-Kovacs
(74) *Attorney, Agent, or Firm* — Michael Best & Friedrich LLP (57) ABSTRACT

An agricultural harvesting head includes a frame on which two endless belt side conveyors are mounted. The return run of the side conveyors is supported on long support strips surmounted by plastic wear strips that are mounted on top of support arms. The support arms extend forward from the rear of the frame to support a reciprocating knife mounted to the front of the agricultural harvesting head.

14 Claims, 6 Drawing Sheets

(56) References Cited

U.S. PATENT DOCUMENTS

| | | | | |
|---|---|---|---|---|
| 8,065,865 B1* | 11/2011 | Dow | A01D 57/20 | 56/181 |
| 8,191,344 B2* | 6/2012 | Sauerwein | A01D 57/20 | 198/836.1 |
| 8,205,421 B2* | 6/2012 | Sauerwein | A01D 41/14 | 56/181 |
| 8,291,686 B1* | 10/2012 | Cormier | A01D 61/002 | 56/181 |
| 8,322,520 B2* | 12/2012 | Dow | A01D 61/002 | 198/837 |
| 8,484,939 B1* | 7/2013 | Cormier | A01D 43/06 | 56/158 |
| 8,511,050 B1* | 8/2013 | Cormier | A01D 41/14 | 56/158 |
| 2002/0129591 A1* | 9/2002 | Patterson | A01D 57/20 | 56/158 |
| 2005/0194235 A1* | 9/2005 | Wilmo | B65G 15/42 | 198/494 |
| 2007/0193243 A1* | 8/2007 | Schmidt | A01D 41/14 | 56/181 |
| 2008/0092508 A1* | 4/2008 | Talbot | A01D 57/20 | 56/181 |
| 2008/0271426 A1* | 11/2008 | Lohrentz | A01D 41/14 | 56/153 |
| 2008/0276591 A1 | 11/2008 | Tippery et al. | | |
| 2012/0042617 A1* | 2/2012 | Dow | A01D 61/002 | 56/14.5 |
| 2012/0233974 A1* | 9/2012 | Cormier | A01D 57/20 | 56/181 |
| 2014/0041354 A1* | 2/2014 | Coon | A01D 41/14 | 56/158 |
| 2014/0059995 A1* | 3/2014 | Cormier | A01D 43/06 | 56/181 |
| 2014/0196427 A1* | 7/2014 | Fuechtling | A01D 41/14 | 56/181 |
| 2015/0158672 A1* | 6/2015 | Lenser | B65G 23/06 | 198/617 |
| 2015/0195992 A1* | 7/2015 | Corum | A01D 61/002 | 198/498 |
| 2017/0258009 A1* | 9/2017 | Heyns | A01D 34/04 | |
| 2018/0279554 A1* | 10/2018 | Peters | A01D 61/02 | |

* cited by examiner

POLYMER USED AS DRAPER BELT CONTACT SURFACE

FIELD OF THE INVENTION

This invention relates generally to agricultural combines. More particularly it relates to agricultural harvesting heads for mounting on agricultural combines. Even more particularly, it relates to draper headers for agricultural combines.

BACKGROUND OF THE INVENTION

Agricultural harvesters are designed to travel through agricultural fields harvesting crops. They include a self-propelled combine vehicle connected to an agricultural harvesting head (also called a "header") mounted on the front of the combine.

The head is elongate and extends perpendicular to the direction of travel of the combine. The function of the agricultural harvesting head is to sever the crop plants from the ground, to carry the cut crop material laterally inward to a central portion of the header, and then to convey the cut crop material rearward through a hole in a central rear wall of the header. Once the cut crop material is passed through the hole, it is received in the combine for further processing.

The agricultural harvesting head uses two side conveyors (typically auger conveyors or an endless belt conveyors) to draw the material laterally inward from both sides of the harvesting head to a central region of the head. A second conveyor then receives the cut crop material and conveys it rearward through the hole in the head.

In one common arrangement (often called a "draper"), the conveyors are endless belt conveyors. Each of these conveyors comprise an endless belt that is supported at opposing ends for recirculation about a drive roller and an idler roller. The drive roller is mounted close to the center of the header. The idler roller is located near an outermost lateral and of the header.

Cut crop material is deposited on the upper surface of the endless belts of the left side conveyor in the right side conveyor and is carried laterally inward to a central region of the head.

The endless belt reverses direction as it passes over the drive roller and recirculates back to the idler roller underneath the upper, crop-carrying surface.

One type of endless belt has cleats that are fixed to the outer surface of the belt. These cleats are approximately 25 mm wide, and extend 25 mm above the surface of the belt. They are made of elastomeric material and extend across the web of the endless belt in a direction perpendicular to the direction of travel of the belt. The web of the endless belt is approximately 1 m wide, and each of the cleats as a length that extends across substantially the entire width of the web of the belt.

One problem with this web+cleats arrangement is the damage done to the cleats. The damage is not done when the cleats are facing upward on the upward, crop carrying surface of the endless belt. The damages done when the endless belt is recirculated from the drive roller back to the idler roller. In this downwardly facing and dangling position, the cleats drag against frame structures that are underneath the endless belt. These frame structures wear the cleats and even tear the cleats loose from the web.

One solution to this problem, shown in US 2008/0276591 A1, is to replace the elastomeric top portion of each cleat with a dense polymer that extends the entire length of every cleat, thus providing each cleat with an elongate, slippery, polymeric strip at the top of the cleat. No matter what structure the cleat drags against underneath the endless belt conveyor, the polymeric strip with its inherent low friction, will protect the cleat.

Unfortunately, this also reduces the effectiveness of the cleats when they and their upwardly facing direction, supporting cut crop material, and carrying the cut crop material to the center of the agricultural harvesting head. Providing a high molecular weight, low friction polymer along the length of all the cleats means that friction between the cleats and the cut crop material is also reduced. Cut crop material carried on the top surface of the endless belt conveyor no longer grips the cleats, but tends to slide along the top surface.

Another solution is to provide a smooth painted metal strip underneath the endless belt in which the metal strip extends from the drive roller to the idler roller. The paint is rapidly worn, and the underlying metal surface rusts, thus causing the cleats to wear.

Another solution, provided on draper headers made by MacDon (of Canada) has been to has been to provide an elongate strip with a spray graphite coating underneath the endless belt extending from the drive roller to the idler roller such that the cleats slide along the elongate strip with reduced friction due to the graphite. Unfortunately the graphite wears off and needs replacement.

What is needed is an agricultural harvesting head of the draper type that reduces wear and damage to the cleats, while still providing sufficient friction between each cleat and the crop mat It is an object of this invention to provide such an arrangement.

SUMMARY OF THE INVENTION

In accordance with a first aspect of the invention, an agricultural harvesting head for harvesting crops in an agricultural field is provided, wherein the agricultural harvesting head is configured to be mounted on a combine harvester, the agricultural harvesting head comprising: an elongate frame that extends perpendicular to a direction of travel of the harvesting head as it travels through a field harvesting crops; a rear wall that extends vertically and extends horizontally in a direction parallel to the longitudinal extent of the frame; a conveyor system further comprising a left side conveyor, a right side conveyor, and a center conveyor, wherein the left side conveyor is an endless belt conveyor configured to carry cut crop material laterally from the left end of the frame to a central region of the frame, wherein the right side conveyor is an endless belt conveyor configured to carry cut crop material laterally from the right end of the frame to the central region of the frame, and wherein the center conveyor is disposed to receive cut crop material from both the left side conveyor and the right side conveyor and to carry the cut crop material rearward through a hole in the rear wall; a plurality of support arms extending forward from a rear portion of the frame; a reciprocating knife fixed to forward ends of the plurality of support arms; a support strip fixed above the plurality of support arms and extending laterally across the top of the plurality of support arms and disposed below one of the endless; wherein the left side conveyor and the right side conveyor extend across the plurality of support arms behind the reciprocating knife, and wherein each of the conveyors comprises an endless recirculating belt supported on an idler roller and a drive roller;

and wherein a plastic wear strip is fixed to an upper surface of the support strip to support a return run of the endless recirculating belt.

The plastic wear strip may be between 10 and 30 cm wide.

The plastic wear strip may be fixed to an upper surface of at least one of the plurality of support arms.

The plastic wear strip may be fixed to an upper surface of at least two of the plurality of support arms.

The plastic wear strip may comprise a high molecular weight thermoplastic material.

The plastic wear strip may comprise polyethylene or nylon.

The plastic wear strip may be C-shaped in cross-section.

The plastic wear strip may comprise a central portion extending across the width of the support strip, a first flange extending downward on one side of the central portion, and a second flange extending downward on the opposite side of the central portion.

The first flange and the second flange may engage opposing sides of the support strip and thereby together hold the plastic wear strip to the support strip.

The support strip may be attached to the plurality of support arms with a first plurality of fasteners, and wherein the plastic wear strip is attached to the support strip with a second plurality of fasteners.

The first plurality of fasteners may comprise threaded fasteners, rivets, or clips.

The second plurality may comprise threaded fasteners, rivets, or clips.

The support strip and the plastic wear strip may have the same width.

The same width may be between 10 and 30 cm.

DETAILED DESCRIPTION OF THE PREFERRED EMBODIMENTS

Figure 1:
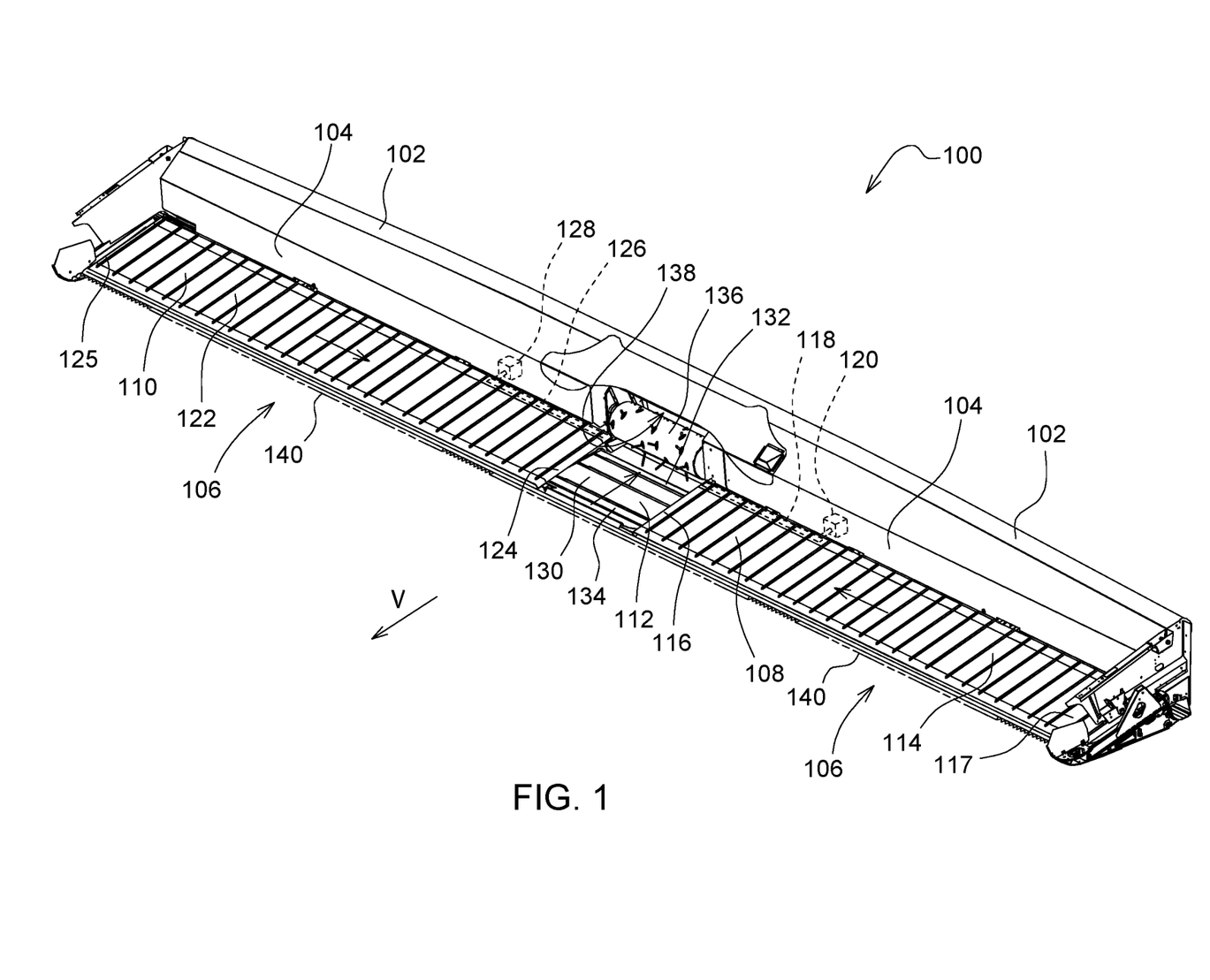
FIG. 1 is a perspective view of an agricultural harvesting head in accordance with the present invention.

In FIG. 1, an agricultural harvesting head 100 comprises an elongate frame 102 that extends laterally and perpendicular to a direction of travel "V". The frame 102 extends substantially the entire width of the head 100. The frame 102 is fixed to a vertical rear wall 104 that also extends substantially the entire width of the head 100.

The frame 102 supports a conveyor system 106 that extends forward from the bottom of the frame 102 and laterally outward, generally perpendicular to the direction of travel "V".

Conveyor system 106 is an endless belt conveyor system, in which each conveyor of the conveyor system 106 is supported on at least two rollers, including a drive roller and an idler roller. Each drive roller is coupled to a rotary drive motor which drives the drive roller in rotation. The conveyor system 106 forms a working floor of head 100.

Conveyor system 106 includes three conveyors: the left side conveyor 108, right side conveyor 110, and a center conveyor 112. These three conveyors comprise substantially the entire horizontal working surface of the combine between the reciprocating knife 140 and the rear wall 104.

The left side conveyor 108 includes an endless recirculating belt 114 that is supported at its inner end on a drive roller 116 located adjacent to the center conveyor 112 in the central region of the agricultural harvesting head 100, and is supported at its opposing outer end on a idler roller 117 that is located adjacent to the leftmost end of the agricultural harvesting head 100.

An endless drive belt 118 is coupled at its inner end to the drive roller 116 to drive the drive roller 116 in rotation. The endless drive belt 118 is coupled at its opposing outer end to a drive motor 120 which drives the endless drive belt 118 in rotation.

The right side conveyor 110 includes an endless recirculating belt 122 that is supported at its inner end on a drive roller 124 located adjacent to the center conveyor 112 in the central region of the agricultural harvesting head 100, and is supported at its opposing outer end on an idler roller 125 that is located adjacent to the rightmost end of the agricultural harvesting head 100.

An endless drive belt 126 is coupled at its inner end to the drive roller 124 to drive the drive roller 124 in rotation. The endless drive belt 126 is coupled at its opposing outer end to a drive motor 128 which drives the endless drive belt 126 in rotation.

The center conveyor 112 includes an endless recirculating belt 130 that is supported on a drive roller 132 at its rear end, and an idler roller 134 at its front end. The drive roller 132 is driven by a drive motor (not shown).

The drive roller 116 and the drive roller 124 are driven in a direction that draws the upper surface of their respective endless recirculating belts inwardly toward the central region of the agricultural harvesting head 100. The left side conveyor 108 and the right side conveyor 110 carry the crop inwardly from the respective left and the right ends of the agricultural harvesting head 100. The cut crop material is carried over the top of the drive roller 116 and the drive roller 124 and is deposited upon the endless recirculating belt 130 of the center conveyor 112.

The drive roller 132 of the center conveyor 112 is driven in a direction that draws the upper surface of the endless recirculating belt 130 in a rearward direction. This carries cut crop material deposited upon the center conveyor 112 rearwardly, and underneath a drum conveyor 136. The drum conveyor 136 is driven in a direction that engages the top of the cut crop material and pulls it underneath the drum conveyor 136 itself. The crop material carried rearward underneath the drum conveyor 136 is ejected through a rectangular hole 138 in the rear wall of the agricultural harvesting head 100. The cut crop material passing through the rectangular hole 138 is received in a feederhouse (not shown) of an agricultural combine (not shown) in the conventional manner.

An elongate reciprocating knife 140 is fixed to a forward lower edge of the frame 102 and extends across the entire width of the agricultural harvesting head 100 along the lower forward margin of the head 100. Knife 140 is disposed immediately in front of and at the same height as the forward edge of the endless recirculating belts of the left side conveyor 108 and the right side conveyor 110.

Agricultural combines carry the agricultural harvesting head 100 through the field harvesting crops in a direction "V" (FIG. 1). As the knife 140 engages crop plants, it severs the crop plants adjacent to the ground, the cut crop plants fall backwards and onto the endless belts of the conveyor system 106.

Figure 2:
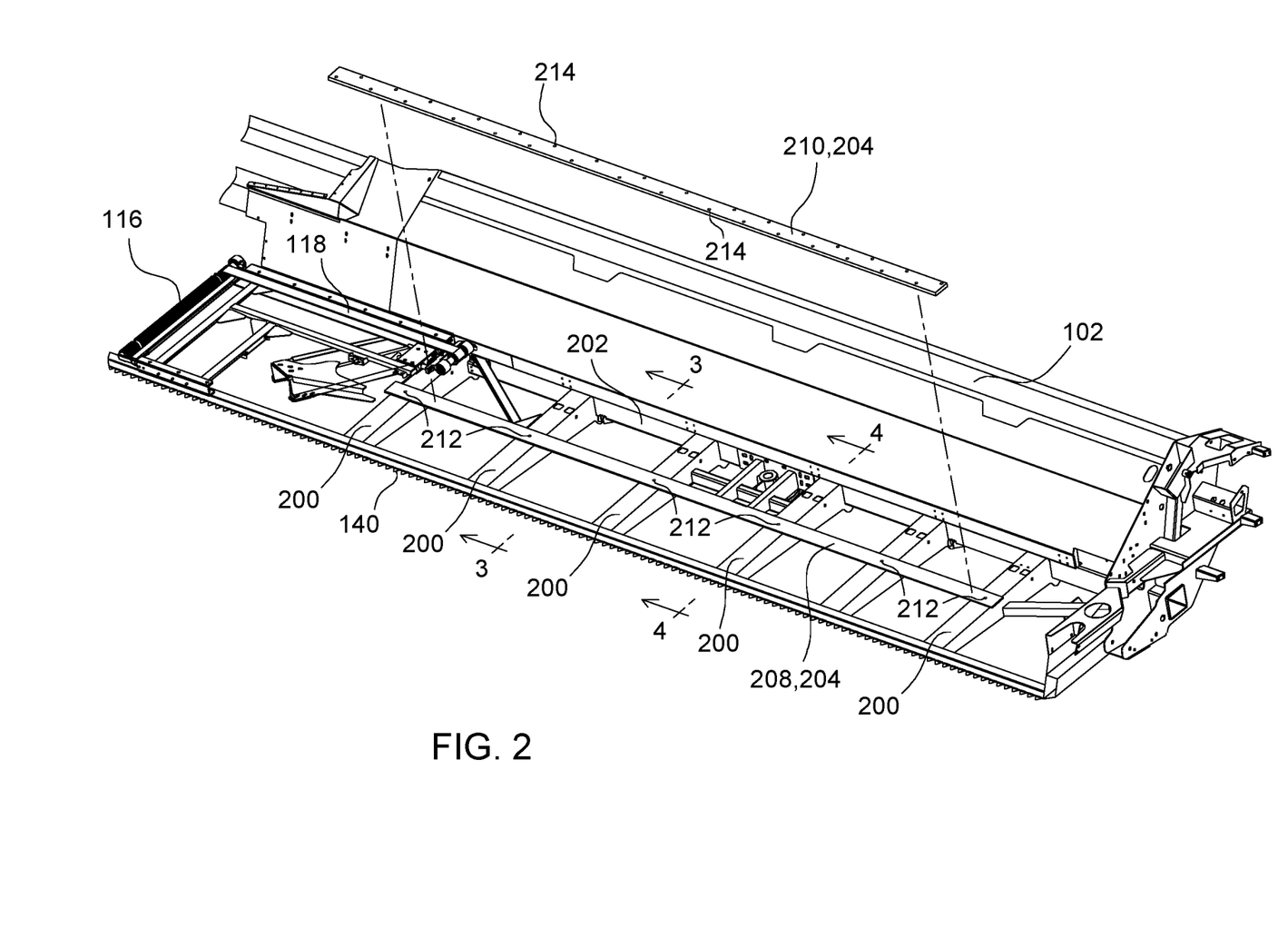
FIG. 2 is a fragmentary perspective view of the left side of agricultural harvesting head of FIG. 1 with the left side draper belt removed in which a belt guide is shown in an exploded arrangement.
Figure 3:
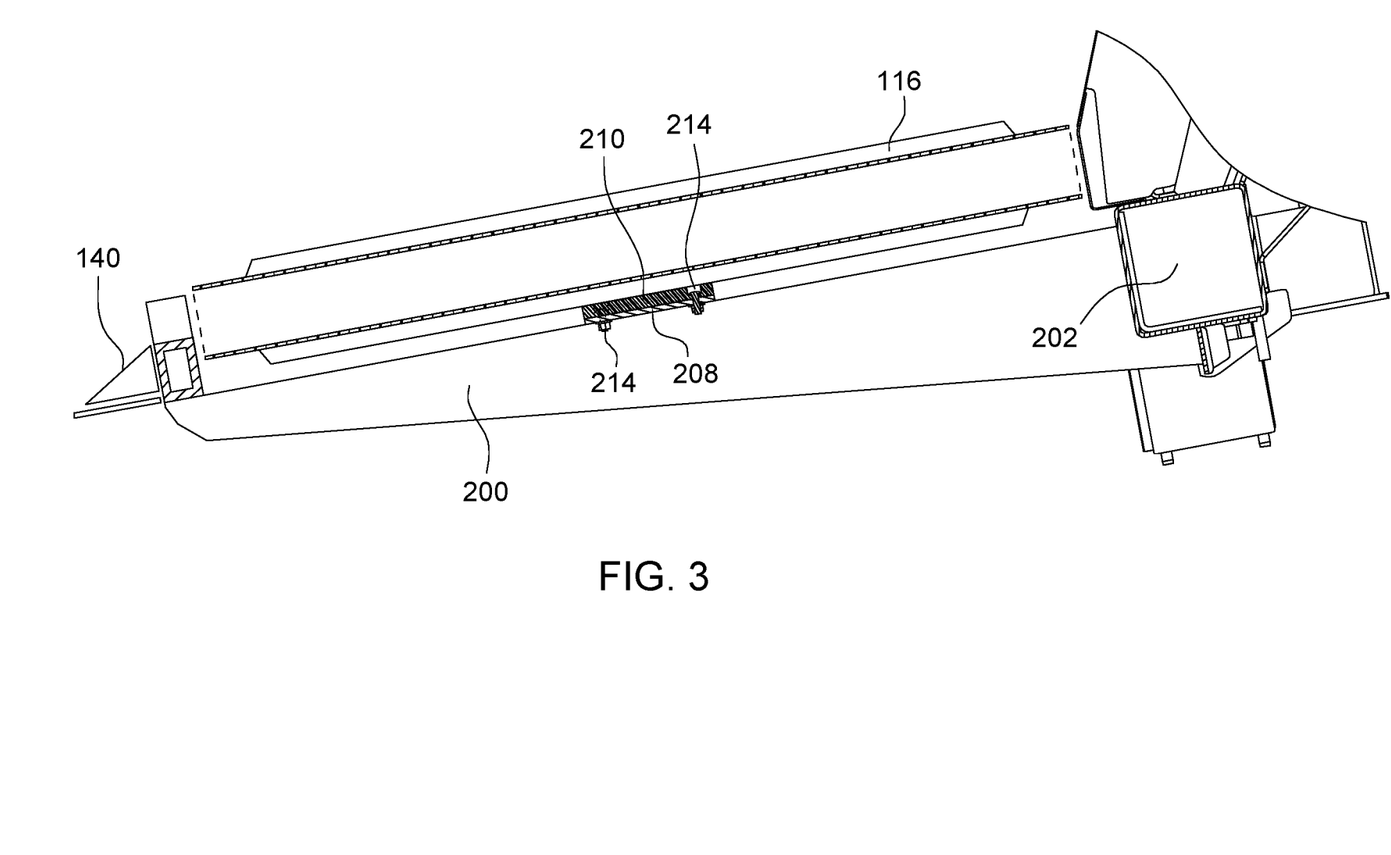
FIG. 3 is a cross-sectional view of the agricultural harvesting head of FIG. 2 taken at section line 3-3 in FIG. 2.
Figure 4:
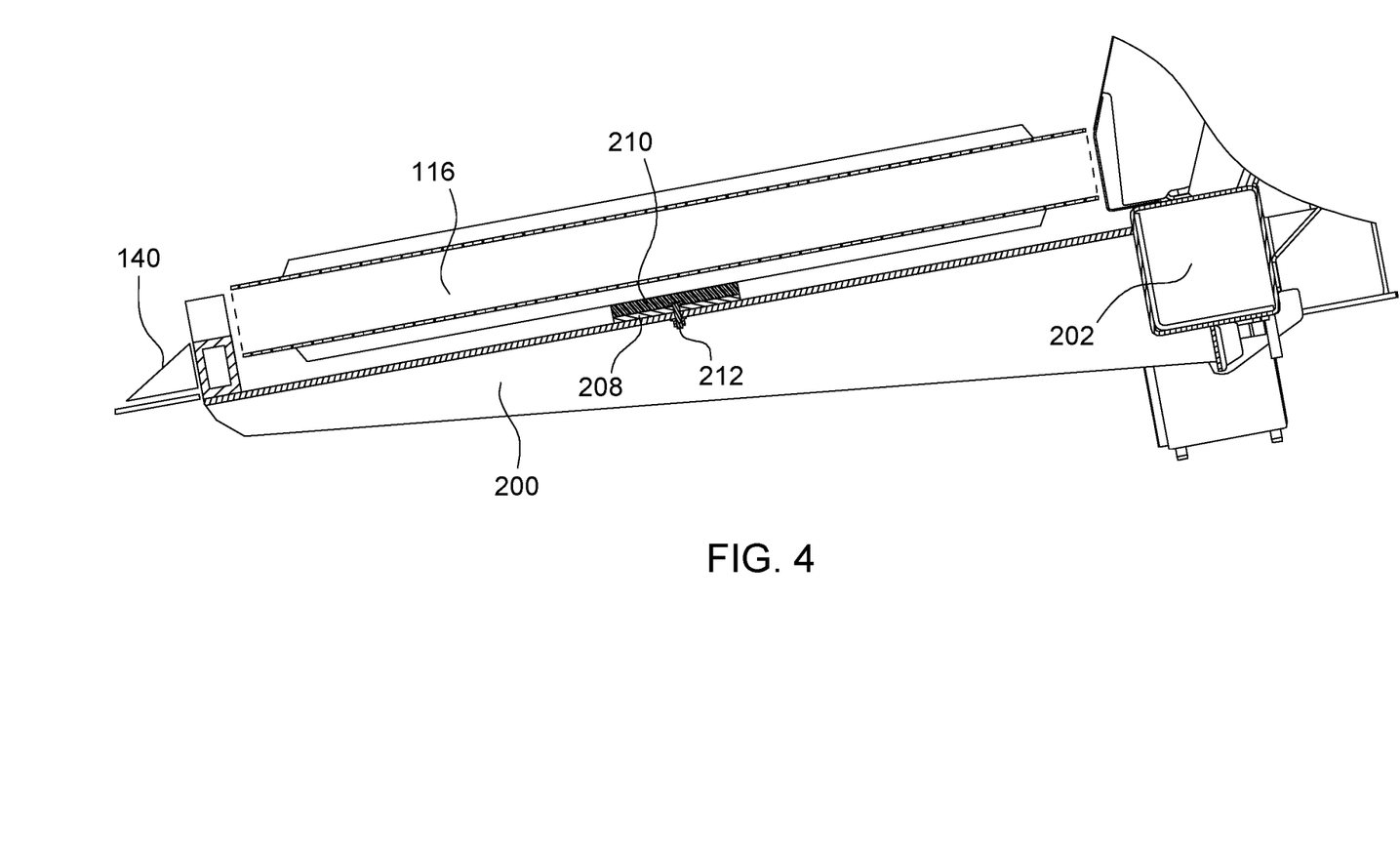
FIG. 4 is a cross-sectional view of the agricultural harvesting head of FIG. 2 taken at section line 4-4 in FIG. 2.

In FIG. 2, the endless recirculating belts 114 and 122 have been removed to show the structures underneath the conveyors 108 and 110 and belts 114 and 122.

Frame 102 includes several support arms 200 that are fixed to a laterally extending rear frame members 202. Frame members 202 extend substantially the entire longitudinal extent of the agricultural harvesting head 100. The support arms 200 are spaced apart from each other and extend forward from frame members 202 to the reciprocating knife 140. The support arms 200 are fixed to the reciprocating knife 140 at their forward ends and are fixed to the frame members 202 at their rear ends. The support arms 200 support the reciprocating knife 140.

A belt guide 204 is mounted to the upper surface of the support arms 200 that are disposed underneath the left side conveyor 108. The belt guide 204 extends from the drive roller 116 to the idler roller 117. The belt guide 204 is substantially narrower (in a fore-and-aft direction) than the width of the endless recirculating belt 114 (FIG. 1). The belt guide 204 has a planar upper surface that is generally parallel to the upper, crop conveying surface of the endless recirculating belt 114. When the belt 114 wraps around underneath the drive roller 116 and returns toward the idler roller 117, this lower run of the belt 114 rests upon and is supported evenly across the width of the belt guide 204. This reduces pressure, and thus wear of the cleats against the top surface of the belt guide 204. The belt guide 204 preferably has a width of between 10 and 30 cm.

The belt guide 204 is illustrated in FIG. 2 in an exploded view. The belt guide 204 is formed in two layers. It includes an elongate support strip 208 that is fixed to the top of the support arms 200 and a wear strip 210 that is fixed to the support strip 208.

The support strip 208 is fixed to the top of one or more support arms with fasteners 212. Fasteners 212 are preferably threaded fasteners, rivets or clips. In one arrangement, shown here, every support arm 200 is fixed to the support strip with a fastener 212. In an alternative arrangement, a couple of fasteners 212 can be used to fix the opposing ends of the support strip 208 to support arms 200 at opposing ends of the support strip.

Wear strip 210 is attached to support strip 208 with a plurality of fasteners 214 (such as threaded fasteners, rivets, or clips) better spaced apart and attached adjacent to the leading edge edges and to the trailing edges of the wear strip 210 and the support strip 208. In FIG. 2, 31 fasteners 214 are shown.

Figure 5:
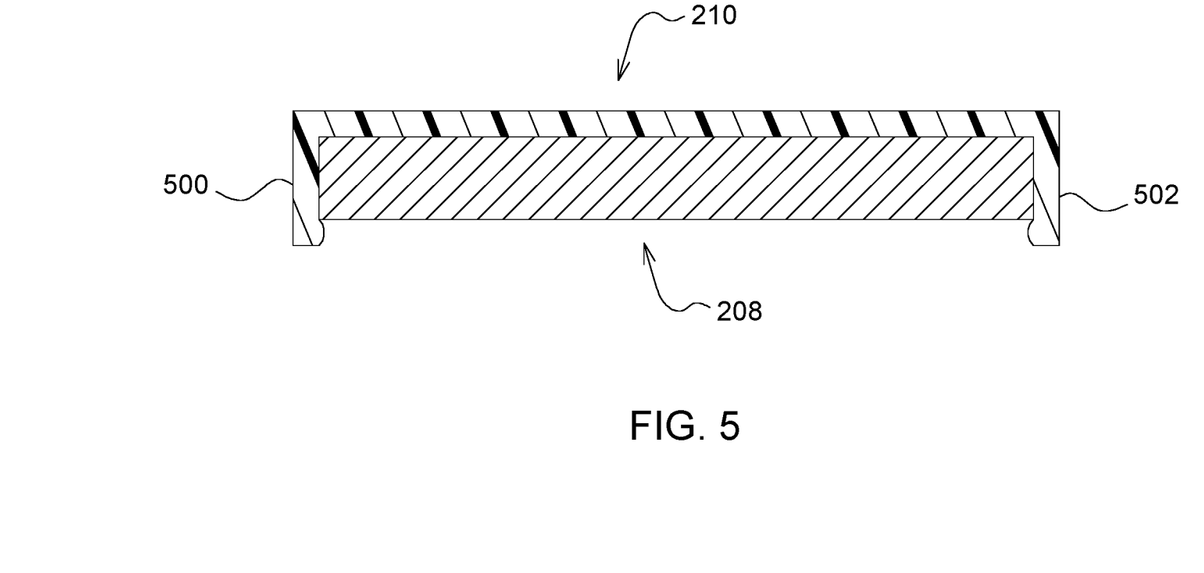
FIG. 5 illustrates an alternative construction of the support strip and the wear strip in cross-section.

In an alternative arrangement (shown in cross-section in FIG. 5), wear strip 210 can have a C-shaped cross-section in which the elongate forward edge and the elongate rear edge of the wear strip 210 wrap around the sides of the support strip 208, with sufficient friction to hold the wear strip 210 against the support strip 208 with either no fasteners or a reduced number of, fasteners 212, 214. In this arrangement, the C-shaped profile includes two flanges 500, 502 that extend downward from a central flat portion 504 and engage respecting opposing sides of the support strip 208. This arrangement permits faster replacement of the wear strip 210.

Figure 6:
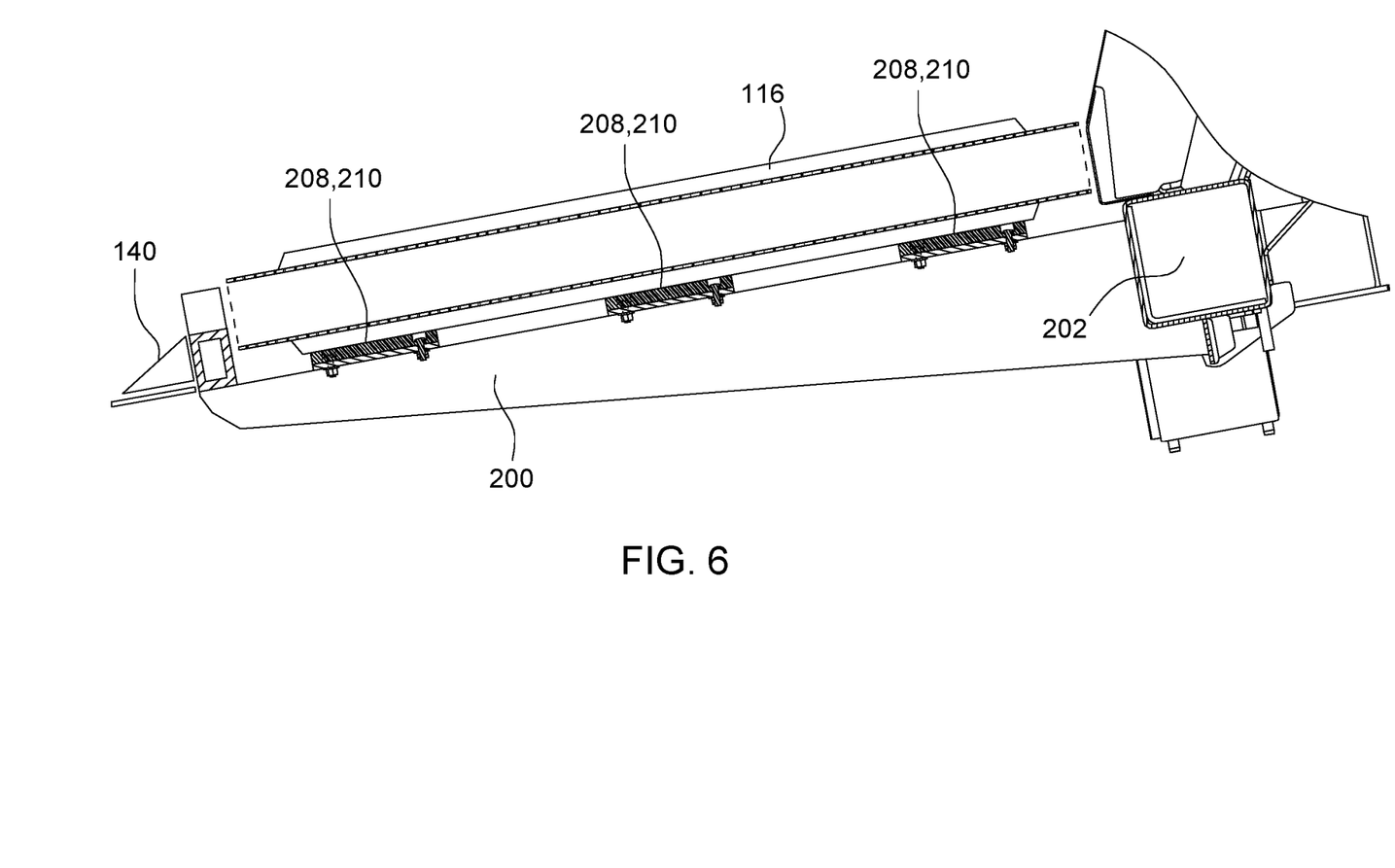
FIG. 6 illustrates an alternative arrangement of multiple support strip/wear strip combinations on a support arm in cross-section.

In another alternative arrangement, (shown in cross-section in FIG. 6), a plurality of support strips 208 and wear strips 210 according to any of the arrangements and constructions described herein can be disposed in a fore-and-aft, spaced-apart relationship across each of the support arms 200. FIG. 6 is a cross-sectional view this alternative arrangement showing the location of the multiple strips 208, 210 as they would appear taken at section line 4-4 in FIG. 2.

FIGS. 2-6 (discussed above) illustrate the construction and operation of the left side conveyor 108. The right side conveyor 110 (including without limitation, its support arms, wear strips, and support strips) is identically constructed and operates identically as the left side conveyor 108, but in mirror image form. For that reason the right side conveyor 110 will not be separately discussed.

The invention is defined by the claims. The description and figures in this document are intended to show a few ways of making and using the claimed invention. Other ways of making the claimed invention are known to those skilled in the art.

The invention claimed is:

1. An agricultural harvesting head for harvesting crops in an agricultural field, wherein the agricultural harvesting head is configured to be mounted on a combine harvester, the agricultural harvesting head comprising:
    an elongate frame that extends perpendicular to a direction of travel of the harvesting head as it travels through a field harvesting crops;
    a rear wall that extends vertically and extends horizontally in a direction parallel to the longitudinal extent of the frame;
    a conveyor system further comprising a left side conveyor, a right side conveyor, and a center conveyor, wherein the left side conveyor is an endless belt conveyor configured to carry cut crop material laterally from the left end of the frame to a central region of the frame, wherein the right side conveyor is an endless belt conveyor configured to carry cut crop material laterally from the right end of the frame to the central region of the frame, and wherein the center conveyor is disposed to receive cut crop material from both the left side conveyor and the right side conveyor and to carry the cut crop material rearward through a hole in the rear wall;
    a plurality of support arms extending forward from a rear portion of the frame;
    a reciprocating knife fixed to forward ends of the plurality of support arms; and
    a support strip fixed above the plurality of support arms and extending laterally across the top of the plurality of support arms and disposed below one of the endless belt conveyors,
    wherein the left side conveyor and the right side conveyor extend across the plurality of support arms behind the reciprocating knife, and wherein each of the conveyors comprises an endless recirculating belt supported on an idler roller and a drive roller, and wherein a plastic wear strip is fixed to an upper surface of the support strip to support a return run of the endless recirculating belt of the one of the endless belt conveyors.

2. The agricultural harvesting head of claim 1, wherein the plastic wear strip is between 10 and 30 cm wide.

3. The agricultural harvesting head of claim 1, wherein the plastic wear strip is fixed to an upper surface of at least one of the plurality of support arms.

4. The agricultural harvesting head of claim 3, wherein the plastic wear strip is fixed to an upper surface of at least two of the plurality of support arms.

5. The agricultural harvesting head of claim 1, wherein the plastic wear strip comprises a high molecular weight thermoplastic material.

6. The agricultural harvesting head of claim 5, wherein the plastic wear strip comprises polyethylene or nylon.

7. The agricultural harvesting head of claim 1, wherein the plastic wear strip is C-shaped in cross-section.

8. The agricultural harvesting head of claim 7, wherein the plastic wear strip comprises a central portion extending across the width of the support strip, a first flange extending downward on one side of the central portion, and a second flange extending downward on the opposite side of the central portion.

9. The agricultural harvesting head of claim 8, wherein the first flange and the second flange engage opposing sides of the support strip and thereby together hold the plastic wear strip to the support strip.

10. The agricultural harvesting head of claim 1, wherein the support strip is attached to the plurality of support arms with a first plurality of fasteners, and wherein the plastic wear strip is attached to the support strip with a second plurality of fasteners.

11. The agricultural harvesting head of claim 10, wherein the first plurality of fasteners comprise threaded fasteners, rivets, or clips.

12. The agricultural harvesting head of claim 11, wherein the second plurality of fasteners comprise threaded fasteners, rivets, or clips.

13. The agricultural harvesting head of claim 1, wherein the support strip and the plastic wear strip have the same width.

14. The agricultural harvesting head of claim 13, wherein the same width is between 10 and 30 cm.

* * * * *